(12) United States Patent
Wu et al.

(10) Patent No.: US 12,464,174 B1
(45) Date of Patent: Nov. 4, 2025

(54) OBJECTIVE VIDEO QUALITY ASSESSMENT MODELS BASED ON BITSTREAM, AND ADDITIONAL PIXEL DOMAIN FEATURES

(71) Applicant: Amazon Technologies, Inc., Seattle, WA (US)

(72) Inventors: Yongjun Wu, Bellevue, WA (US); Hai Wei, Seattle, WA (US); Sriram Sethuraman, Bangalore (IN); Yixu Chen, Seattle, WA (US); Zaixi Shang, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 308 days.

(21) Appl. No.: 18/066,202

(22) Filed: Dec. 14, 2022

(51) Int. Cl.
*H04N 21/234* (2011.01)
*G06V 10/70* (2022.01)
*H04N 19/124* (2014.01)
*H04N 19/139* (2014.01)
*H04N 21/2187* (2011.01)

(52) U.S. Cl.
CPC ....... *H04N 21/23418* (2013.01); *G06V 10/70* (2022.01); *H04N 19/124* (2014.11); *H04N 19/139* (2014.11); *H04N 21/2187* (2013.01)

(58) Field of Classification Search
CPC .......... H04N 21/23418; H04N 19/124; H04N 19/139; G06V 10/70
See application file for complete search history.

(56) References Cited

U.S. PATENT DOCUMENTS

| | | | | |
|---|---|---|---|---|
| 10,638,127 | B2* | 4/2020 | Yu | H04N 19/107 |
| 2006/0045186 | A1* | 3/2006 | Koto | H04N 19/139 |
| | | | | 375/E7.149 |
| 2006/0171458 | A1* | 8/2006 | Feng | H04N 19/48 |
| | | | | 375/240.03 |
| 2014/0044197 | A1* | 2/2014 | Liao | H04N 21/2662 |
| | | | | 375/E7.2 |
| 2016/0037167 | A1* | 2/2016 | Wen | H04N 19/172 |
| | | | | 375/240.07 |
| 2018/0332281 | A1* | 11/2018 | Yu | H04N 19/176 |
| 2019/0289296 | A1* | 9/2019 | Kottke | H04N 19/179 |
| 2020/0128274 | A1* | 4/2020 | Rosewarne | H04N 19/645 |
| 2023/0078062 | A1* | 3/2023 | Koike | H04N 19/30 |
| | | | | 375/240.26 |
| 2023/0113552 | A1* | 4/2023 | Zhou | H04N 19/132 |
| | | | | 375/240.25 |

(Continued)

OTHER PUBLICATIONS

"Recommendation ITU-T P.1204.3: Video quality assessment of streaming services over reliable transport for resolutions up to 4K with access to full bitstream information," International Telecommunication Union, Jan. 2020, 24 pages.

(Continued)

*Primary Examiner* — Peter D Le
(74) *Attorney, Agent, or Firm* — Weaver Austin Villeneuve & Sampson LLP (57) ABSTRACT

Techniques are described for training and use of machine learning models to determine objective video quality scores. Video quality scores predict the quality of video content perceived by viewers. Quality scores have various uses, including the selection of encoding profiles and determination of encoding ladders. A core model and residual model may be used to determine quality scores.

20 Claims, 8 Drawing Sheets

(56) References Cited

U.S. PATENT DOCUMENTS

| | | | |
|---|---|---|---|
| 2023/0379551 A1* | 11/2023 | Ashwathappa | H04N 21/23418 |
| 2024/0140479 A1* | 5/2024 | Asher | B60W 60/001 |
| 2024/0155070 A1* | 5/2024 | Liu | G06T 3/4053 |
| 2024/0370985 A1* | 11/2024 | Chen | G06T 7/0002 |

OTHER PUBLICATIONS

"Recommendation ITU-T P.910: Subjective video quality assessment methods for multimedia applications," International Telecommunication Union, Jul. 2022, 54 pages.

* cited by examiner

| Feature Source | Feature Name | Descriptions | Block to Frame Pooling | Frame to Segment Pooling | Encoder-Side Feature Enhancement |
|---|---|---|---|---|---|
| Bitstream | FrameSize | The encoded final frame size of each frame | N/A | mean/std/kurtosis/min/max | |
| Bitstream | min_QP | Minimum QP of every blocks in a frame | min | IQR | |
| Bitstream | max_QP | Maximum QP of every blocks in a frame | max | std | Encoder-side QP will take skipped blocks on B/P frames into consideration during frame pooling |
| Bitstream | Av_QP | Mean QP of every blocks in a frame | mean | mean/std/kurtosis/min/max | |
| Bitstream | MotionWeightedQP | Spatial Motion weighted QP. For each block a logistics function is used to map the resolution-normalized and frame-rate normalized motion vector length to a weight that will be multiplied to the QP of that block. | weighted average | median | QP may only measure the quantization on residual. Sum of absolute difference (SAD) or Hadamard Transformed SAD (SATD) on the encoder-side measures the true distortion including prediction error and quantization error. QP is replaced with the SAD or SATD. |
| Bitstream | AvQpLm | Mean QP of high motion blocks | mean | median | |
| Bitstream | AvQpHm | Mean QP of low motion blocks | mean | median | |
| Bitstream | wQP | Temporal weighted QP. It uses frame average motion and logistic to assign weights to each frame's average QP | mean | weighted average | |
| Bitstream | qp_larger | Average QP from the frames that have average motion larger than threshold | mean | mean | |
| Bitstream | qp_smaller | Average QP from the frames that have average motion smaller than threshold | mean | mean | |
| Bitstream | AvBlockDepth | The area-weighted (4x4 block granularity) average log2 of block size (similar to block depth). The smaller this number the finer the CU-Quad-Tree are split which means higher spatial-temporal complexity in terms of RD cost. | mean | median/kurtosis | |
| Bitstream | SkipBlksRatio | The percentage of skipped blocks (without motion vector difference and without transform coefficients) in B and P frames | percentage | median/kurtosis | |
| Bitstream | CbfBlksRatio | The percentage of blocks that have transform coefficients | percentage | median/kurtosis | |

FIG. 7A

| Feature Source | Feature Name | Descriptions | Block to Frame Pooling | Frame to Segment Pooling | Encoder-Side Feature Enhancement |
|---|---|---|---|---|---|
| Bitstream | StdDev_Motion | The standard deviation of motion vector length for each frame | standard deviation | mean | |
| Bitstream | Av_Motion | The average motion vector length for each frame | mean | mean/kurtosis | |
| Bitstream | AvgQpLocalMvDir | Average QP for blocks whose motion vector direction is not aligned with global camera motion (local random motion) | weighted average | mean | On the Encoder-side motion is determined from the more accurate motion vectors from hierarchical motion estimation without considering coding rate cost |
| Bitstream | AvgQpGlobalMvDir | Average QP for blocks whose motion vector direction is aligned with global camera motion | weighted average | mean | |
| Bitstream | MvGlobalAngleRatio | Motion randomness. The percentage of angle (bins) where 80% of blocks' MV angles are distributed. The smaller the MvGlobalAngleRatio of that frame the less random (motion will be in more uniform direction) the motion is. | percentage | mean | |
| Metadata | Resolution | Resolution in terms of pixel number in a video | | | |
| Metadata | FrameRate | Frames per second | | | |
| Metadata | Codec | Video codec | | | |
| Metadata | BitDepth | Bitdepth of the pixel format in a codec | | | |
| Metadata | Bitrate | Average bitrate of the video segment | | | |
| Metadata | CRF | Constant Rate Factor used to set the quality level in variable bitrate encoding mode | | | |
| Metadata | maxFall | Maximum Frame Average Light Level. Averaging the decoded luminance values of all the pixels within a frame | | mean | |
| Metadata | maxCll | Maximum Content Light Level. The maximum light level of any single pixel (in cd/m2 or nits) of the entire playback sequence. | | | |
| Pixel | wMSE_freqMID | In frequency domain, strong edges usually result in large value of low-mid frequency coefficients. The sum of specific frequency domain coefficients is a good indicator of the edge energy. | weighted average | mean | |
| Pixel | wMSE_blockVar | This feature assign weights to MSE from different block based on that block's pixel value variance. | weighted average | mean | |
| Pixel | SI | Spatial Perceptual Information defined in ITU-T Recommendation P.910 | standard deviation | max | |
| Pixel | TI | Temporal Perceptual Information defined in ITU-T Recommendation P.910 | standard deviation | max | |

FIG. 7B

OBJECTIVE VIDEO QUALITY ASSESSMENT MODELS BASED ON BITSTREAM, AND ADDITIONAL PIXEL DOMAIN FEATURES

BACKGROUND

Streaming video services encode source content into various resolution and bit rate levels. These various resolution and bit rate levels allow the streaming video service to tailor video streams to a customer's playback device capability and bandwidth availability. On the client side, software running on the playback device adaptively switches between resolution and bit rate levels according to algorithms that manage the video quality and playback experience.

For a streaming video service with a large media content catalog having diverse content characteristics, determining the specific set of available resolution and bit rate levels for optimizing the customer experience remains a challenge. Furthermore, for a given resolution and bit rate level, automated and efficient determination of the values for encoding parameters is also a challenge. This challenge is increased in the context of codecs with numerous encoding parameters, including such codecs as the Advanced Video Coding (AVC), High-Efficiency Video Coding (HEVC), and AOMedia Video 1 (AV1) codecs. Specifically, such codecs utilize encoding profiles having numerous encoding parameters (e.g., 30-50 parameters), such as quantization parameters, block size parameters, adaptive encoding optimization parameters, and so forth, with each encoding parameter having either direct or indirect impact on final video quality.

For video-media services and applications, video quality represents an important component of user experience. Streaming video services have conventionally relied on human subject matter experts and/or naïve subjects to perform trial and error analysis on a limited dataset to assess video quality and determine a set of encoding profiles. Objective video quality assessment (VQA) models are used to analyze encoded video to determine a quality of the video without the need for expensive and complex subjective viewer assessments. A high quality VQA model accurately predicts video quality that would be perceived by a user.

BRIEF DESCRIPTION OF DRAWINGS

FIGS. 7A and 7B present charts of various features that may be used for determining quality scores according to various embodiments herein.

DETAILED DESCRIPTION

This disclosure relates to techniques for assessing video quality. For media services and applications, video quality represents an important component of the users' experience. Subjective quality tests are typically the most reliable indicator of quality, however they are expensive to conduct and cannot be used in a live stream context. Objective models are thus used instead to predict quality scores. Bitstream-based video quality assessment (VQA) models are a class of video quality assessment model that may analyze encoded video bitstreams without fully decoding the bitstream and may not require access to the original bitstream of the source signal. A bitstream-based VQA model is described herein that may use features from the encoded bitstream and machine learning models to determine an objective quality score. VQA models are typically trained on a subjective video quality dataset. For example, users may view videos from various encoding parameter setups and provide quality scores, and the quality scores of the same video from multiple subjects may be combined to compute, e.g., mean opinion scores (MOS) for a video. An objective VQA model may be determined or trained to predict MOS or other quality scores.

To determine a quality score, a VQA model may use various features of a video. VQA models may be grouped into various categories based on the features they use, including metadata-based models, bitstream-based models, pixel-based models, and hybrid models that may use a combination of metadata, bitstream, and pixel features. Typically, pixel features provide the most information for determining quality scores, and in a video-on-demand context a VQA model may use features that may be extracted from pixel values to determine an objective quality score. However, a pixel-based features may be computationally expensive to determine, including the need to decode frames to determine pixel values and determine statistics from the pixel values. In a live context it is desirable for a VQA model to be able to operate fast enough to provide feedback, for example on a per segment basis, and thus may only operate on features that are efficient to calculate or embedded in a bitstream to improve computation speed. Thus, a VQA model that can operate on bitstream data without needing to decode frames to determine pixel values can balance speed with sufficient features to accurately predict objective quality.

VQA models may be used for various purposes for both video on-demand (VOD) and live streaming contexts. As the quality perceived by a viewer has central importance but is costly to determine by subjective experiments, VQA models that accurately predict the quality perceived by viewers are highly desirable. This disclosure relates to techniques and model architectures for improving the determination of objective quality scores, particularly for live events such as live sports or concerts. In some embodiments, a VQA model may be used for improving live streaming video quality across multiple bitrate levels and playback devices, reducing video encodes/fragments bitrate storage and delivery costs adaptive to real-time playback statistics, improving key Quality of Service (QoS) metrics across variegated playback devices, detecting quality defects from video encoding, and providing quality guidance for quality-based heuristics algorithms and video delivery. In some embodiments, quality scores may be used to optimize multiple sets of streaming video encoding profiles (referred to herein as an encoding ladders) to accommodate variegated content and diverse playback conditions.

In some embodiments, various encoding profiles may be previously determined for a given bitrate on an encoding ladder. In some embodiments, a VQA model may be used to determine which encoding profile provides the highest quality. A default encoding ladder may not be well-suited for all content. For example, a particular value for an encoding parameter setting such as the adaptive quantization parameter may provide a high-quality encoding of content of a first category (e.g., concerts having relatively little motion). However, content of a second category (e.g., sports events having a relatively higher degree of motion) might not be encoded as well since the parameter settings for high quality encodings vary based on the characteristics of the content, including, but not limited to, levels of motion, spatial details, and encoding complexity. Content with large smooth areas may be encoded with a higher quality using one set of parameter settings compared to content with high motion. As another example, the default encoding ladder may be well-suited for providing a high-quality encoding of live-action content, but animated content might not be encoded as well since the encoder parameter settings for animated content may vary from live-action content, particularly frame rate settings. Therefore, if the default encoding ladder is tailored to a first category or type of content, other categories or types of content may be encoded with sub-optimal quality and/or result in excessive bitrates. Furthermore, even within a single type of content, different segments may have more or less motion and thus the quality would benefit from different encoding profiles. In some embodiments, encoding profiles may be selected on a per-content type or per-segment basis based on a quality score from a VQA model described herein.

In some embodiments, a VQA model may be used to determine a bitrate cap. A bitrate cap may represent a bitrate where, above that bitrate, the quality of the video does not increase or may even decrease. For example, an encoder may be configured to operate in a quality-defined variable bitrate mode, which may use a higher or lower bitrate during encoding to smooth quality between more and less complex video frames or segments. A bitrate cap may be defined to avoid overcommitting bitrate to encoding a given resolution and/or frame rate where the additional bitrate does not contribute to a higher quality. A VQA model may be used to determine the threshold bitrate that, above such threshold, quality of the video does not significantly increase.

Figure 1:
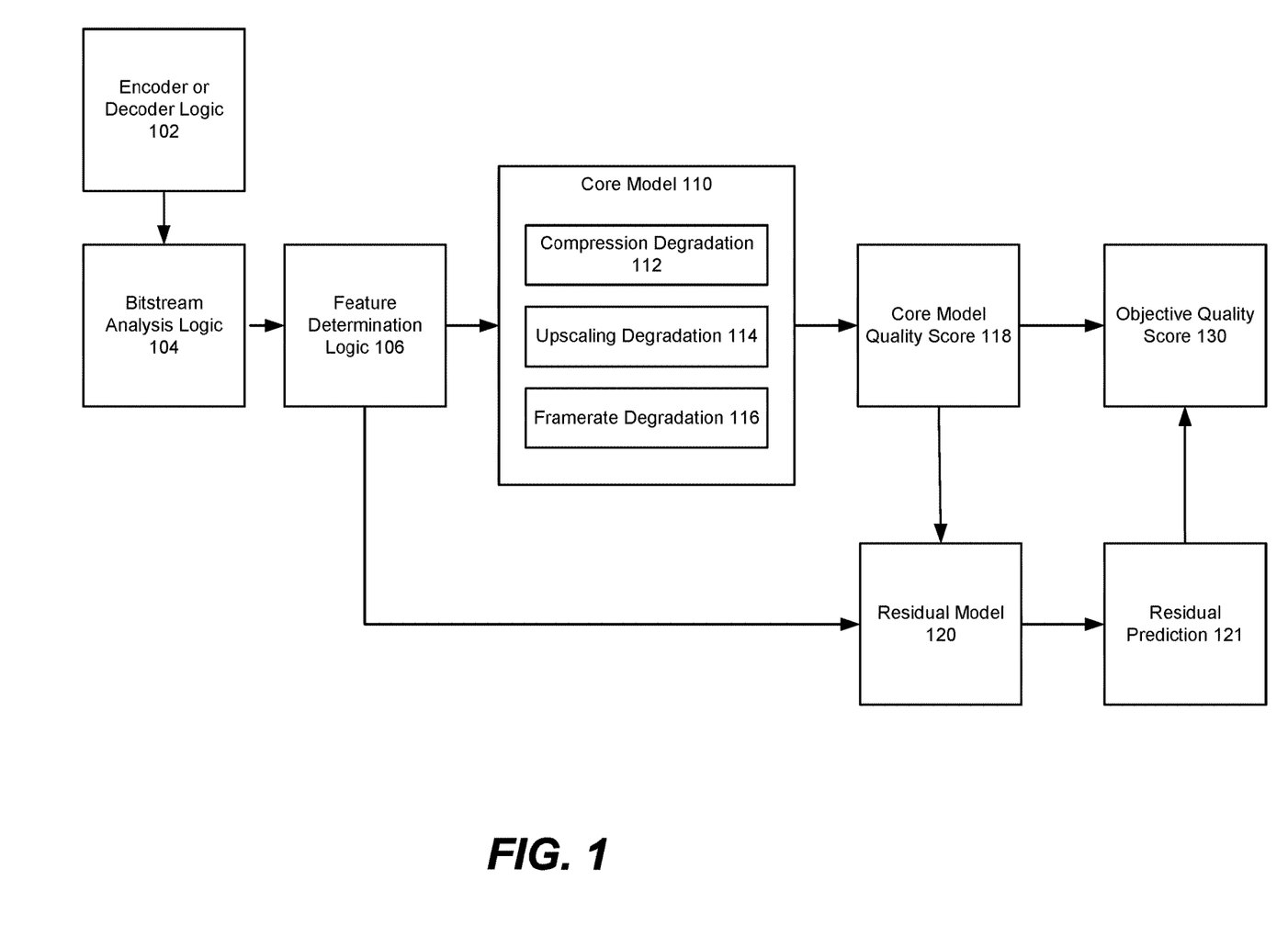
FIG. 1 presents a diagram illustrating an example system that may be used in accordance with the present disclosure.

FIG. 1 presents an illustration of a VQA model according to various embodiments herein. Decoder logic 102 may decode video content according to a particular codec and encoding parameter settings. In some embodiments, a VQA model as described herein may operate on an encoded bitstream, which may then be decoded to determine features from the bitstream. The encoded bitstream may be analyzed by bitstream analysis logic 104 to extract information present in the bitstream. In some embodiments, the encoded bitstream may be decoded to extract features indicating how the bitstream is encoded.

In some embodiments, decoder logic 102 may instead be an encoder. In such embodiments, features may be determined during the encoding of content rather than analyzing an encoded bitstream to determine features. Bitstream analysis logic 104 may operate in conjunction with an encoder to determine features indicating how the bitstream is encoded during the encoding process. In such embodiments the encoded bitstream does not need to be decoded.

In various embodiments a VQA model may be preferably configured to work with an encoder or a decoder. A decoder-based VQA model may be preferable as training data is easier to collect; encoded content may be collected from various codecs and configurations and then decoded to determine features. Thus, a decoder-based VQA model may be easier to train and retrain as additional data becomes available. An encoder-based VQA model may require re-encoding video content to properly determine features for training, which is more computationally expensive and it may be difficult to recreate the original encoding settings. Alternatively, an encoder-based VQA model can generate scores during encoding which may reduce the delay in determining quality scores by eliminating additional decoding time. Thus, during live events quality scores may be used as feedback for encoding or included as part of a manifest provided to client devices as the quality score determinations do not significantly contribute to a delay in live content playback.

Feature determination logic 106 may determine particular features of from the bitstream information. In some embodiments, the bitstream may be partially decoded to determine features. In some embodiments, additional features that are accessible only at the encoder side may result in a more accurate model compared with a decoder side model. Various features used by VQA models are described further herein.

In some embodiments, a VQA model may be structured as two models: a core model 110 that predicts a core model quality score 118, and a residual model 120 that determines a residual prediction 121 that represents a difference between the core model quality score and an unknown true subjective quality score. In some embodiments, the core model may be a parametric model. In some embodiments, the core model and the residual model are machine learning models. In some embodiments, the machine learning models may be regressor models. Regressor models may include, e.g., random forest models, support vector machines, or multilayer perceptron. The subjective quality score may be considered the "true" score, which during training the core model and residual model may be trained on along with various features of video segments. As the core model quality score may be determined based on limited features, an error between the core model quality score and the subjective quality score is expected. In some embodiments, the residual model may be trained to accurately predict this residual and thus improve the core model quality score. A combination of the core model quality score 118 and the residual prediction 121 may be used to determine an objective quality score 130.

In some embodiments, the core model may model three different degradations to the quality of a given video: compression, upscaling, and temporal degradation. In some embodiments, the core model may use bitstream metadata to determine the three degradations. Compression degradation 112 refers to degradation based on a compression setting, such as a quantization parameter (QP), desired bitrate, or rate control setting. In some embodiments, compression degradation may be based on a quantization parameter. Quantization parameter represents a factor applied to residual coefficients that indicate differences in image content the prediction and pristine image to scale down the residual coefficients as a compression technique. The higher the QP the greater the compression, but the less information is preserved and thus the lower the decoded video quality. In some embodiments, this degradation is modelled for a specific codec.

In some embodiments the QP provided to a core model may be based on metadata available in a bitstream. For example, quantization may be set on a per-segment, per-frame, or per-block basis. In some embodiments, a per-segment quantization parameter may represent an average QP or a target average QP for the entire segment. In some embodiments, QP may also be provided for an entire frame or for portions of a frame, such as a block or group of blocks. In various embodiments one or more of these QPs may be provided to a core model to determine a quantization degradation. In some embodiments, as discussed further below, a residual model may also use QPs for various frames or blocks as features for determining a residual prediction to improve a core model quality score.

In some embodiments, a constant rate factor (CRF) may be used instead of or in addition to a QP. A CRF is a designation of a specific quality level that an encoder may then alter various settings to achieve, e.g., a QP. In some embodiments, a CRF may be used instead of a QP for the core model as the CRF may similarly reflect the quality of a video as the QP. Similar to QP, a higher CRF value indicates lower quality/greater compression. In some embodiments CRF is an encoder setting that may be available in encoder-side implementations. In some embodiments a CRF value may be included in metadata that can be passed in the bitstream for a decoder-side implementation to use.

Upscaling degradation 114 refers to degradation from encoded video being upscaled to a higher display resolution. Upscaling may cause blurring artifacts that reduce perceived quality on a higher resolution display. Temporal degradation 116 refers to degradation based on differences between the original video frame rate and a display's frame rate. For example, video quality may decrease if the framerate is less than 60 frames per second. In some embodiments, the QP degradation, upscaling degradation, and temporal degradation represent a degradation from respective reference points. For example, 60 frames per second may be taken as a reference, such that a frame rate less than 60 will be considered to have temporal degradation.

The core model may accept as inputs the average QP for each frame, resolution, and frame rate. The output may be an initial core model quality score 118. This quality score may be correlated with an expected subjective quality score, however the error may be large as the model does not account for features other than QP, resolution, and frame rate. In some embodiments, the core model quality score may be a final objective quality score, particularly if computational speed is important. In some embodiments, the QP, resolution, and frame rate provided to the core model may be indicated in metadata in a bitstream.

A residual model 120 may be used to improve the accuracy of the quality score. The residual model may accept as inputs the quality score from the core model as well as various features of frames within the segment being analyzed. The output of the residual model 120 is a residual prediction 121 that represents a residual between the core model quality score and an unknown subjective quality score. The residual prediction 121 and the core model quality score 118 may be combined to determine an objective quality score 130.

Figure 2:
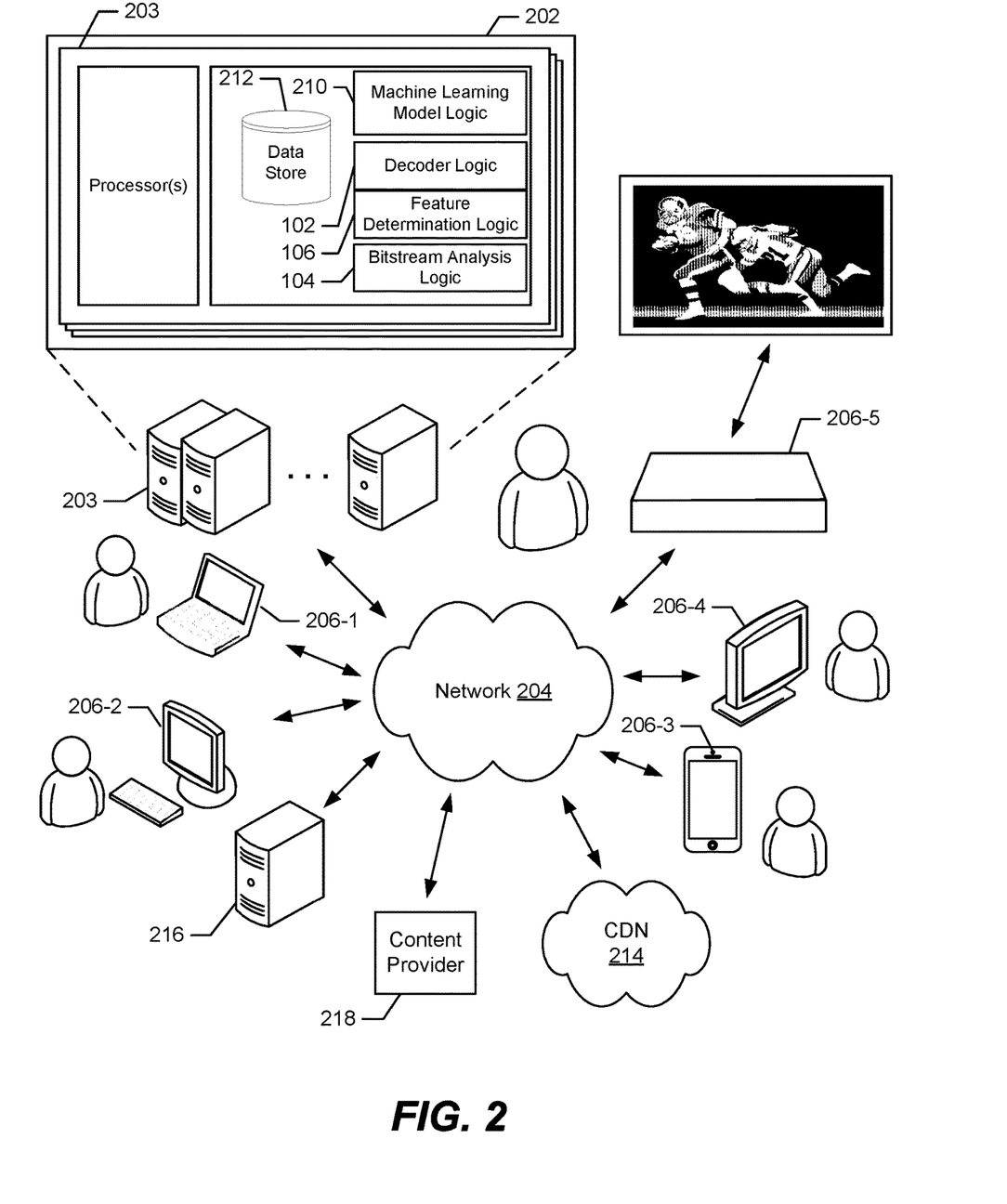
FIG. 2 presents an example diagram for transmitting and computing data in accordance with various embodiments presented herein.

FIG. 2 illustrates an example of a computing environment in which a video content service 202 provides video content via network 204 to a variety of client devices (206-1 through 206-5) in accordance with the techniques described herein. The video content may include live or broadcast content or video-on-demand (VOD) content. In various implementations, the video content may be a video presentation of a live event (e.g., a livestream, broadcast, and/or camera feed of an ongoing live event and/or a recording of a partially or fully-completed event which may also be referred to as formerly-live event). Content service 202 may conform to any of a wide variety of architectures such as, for example, a services platform deployed at one or more co-locations, each implemented with one or more servers 203. Network 204 represents any subset or combination of a wide variety of network environments including, for example, TCP/UDP over IP-based networks, unicast/multicast/broadcast networks, telecommunications networks, wireless networks, satellite networks, cable networks, public networks, private networks, wide area networks, local area networks, the Internet, the World Wide Web, intranets, extranets, and so on. Client devices 206 may be any suitable device capable of connecting to network 204 and consuming content provided by service 202. Such devices may include, for example, mobile devices (e.g., cell phones, smart phones, and tablets), personal computers (e.g., laptops and desktops), set top boxes (e.g., for cable, satellite, and online systems), smart televisions, digital assistant devices, gaming consoles, wearable computing devices (e.g., smart watches or smart glasses), etc.

At least some of the examples described herein contemplate implementations based on computing models that enable ubiquitous, convenient, on-demand network access to a shared pool of computing resources (e.g., networks, servers, storage, applications, and services). As will be understood, such computing resources may be integrated with and/or under the control of the same entity controlling content service 202. Alternatively, such resources may be independent of content service 202, e.g., on a platform under control of a separate provider of computing resources with which content service 202 connects to consume computing resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

In the following examples and for the sake of simplicity, content service 202 is described as if it is integrated with the platform(s) that provides both live content and VOD-style content to client devices. However, it will be understood that content service 202 may provide access to content in conjunction with one or more content delivery networks (e.g., CDN 214) that may or may not be independent of content service 202. In addition, the source(s) of one or both of the broadcast and VOD-style content may or may not be independent of content service 202 (e.g., as represented by content provider server 216, and live content provider 218). The range of variations known to those of skill in the art are contemplated to be within the scope of this disclosure.

Some of the implementations enabled by the present disclosure contemplate logic resident on the client devices consuming video content from content service 202; such logic might be configured to handle, for example, requesting segments based on an adaptive bitrate algorithm. Such logic might be part of an existing algorithm or module on the client device or implemented to work in conjunction with such an algorithm or module.

It should also be noted that implementations are contemplated in which content service 202 may include various types of logic, e.g., machine learning model logic 210 that includes the various trained machine learning models as well as facilitating training of machine learning models. Encoder/ decoder logic 102, feature determination logic 106, and bitstream analysis logic 104 may also be part of content service 202.

In addition to providing access to video content, content service 202 may also include a variety of information related to the video content (e.g., encoding profiles and other associated metadata and manifests in data store 212 to which service 202 provides access). Alternatively, such information associated with and/or about the content, as well as the content itself may be provided and/or hosted by one or more separate platforms, e.g., CDN 214. It should be noted that, while logic 210 and 211, and data store 212 are shown as integrated with content service 202, implementations are contemplated in which some or all of these operate remotely from the associated content service, and/or are under the control of an independent entity. From these examples, those of skill in the art will understand the diversity of use cases to which the techniques described herein are applicable.

It should be appreciated that video samples as referred to herein may be entire video presentations (e.g., an entire movie or sportscast), groups of video presentations, or may be shorter segments within a presentation, e.g., 2-60 second segments including one or more 2-10 second fragments or "groups of pictures" (GOPs). Additionally, it should be appreciated that the video samples as referred to herein may be in a variety of formats and resolutions and may include standard dynamic range (SDR) and high dynamic range (HDR) video content.

It should be noted that the techniques described herein are applicable to various codec implementation, and may be employed to determine video quality scores of encoded video content implemented according to any of a wide variety of video compression standards including, for example, Advanced Video Coding (AVC) or H.264, High Efficiency Video Coding (HEVC) or H.265, AV1, VP8, and VP9, as well as future standards, e.g., H.266. In some embodiments a VQA model is trained for a particular codec or may take a codec as a feature.

Figure 3A:
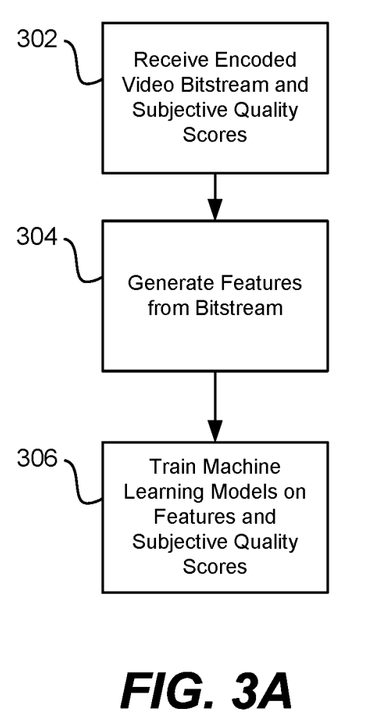
FIGS. 3A-3B present flowcharts illustrating an example process for training machine learning models in accordance with the present disclosure.

FIGS. 3A and 3B presents a flowchart for training machine learning models according to various embodiments herein. In FIG. 3A, encoded video bitstreams and subjective quality score data is received (302). Subjective quality scores are received from user experiments where viewers watch videos of various qualities and rate them. These ratings may then be aggregated across viewers to determine quality scores, including mean opinion scores, of each video for various encodings. The encoded bitstreams, original video, and encoding profiles are all known and may be used as features for training machine learning models (304). Various features may be determined from the video bitstreams. Frame rate, resolution, and quantization parameter have been discussed above, and additional features may also be determined. One or more core models and one or more residual models may be trained on various features described herein (306). In some embodiments, a core model and a residual model may each be regressor models, e.g., random forest models. In some embodiments, the process of FIG. 3A may be used when training a VQA model to be used in a decoder-side implementation.

Figure 3B:
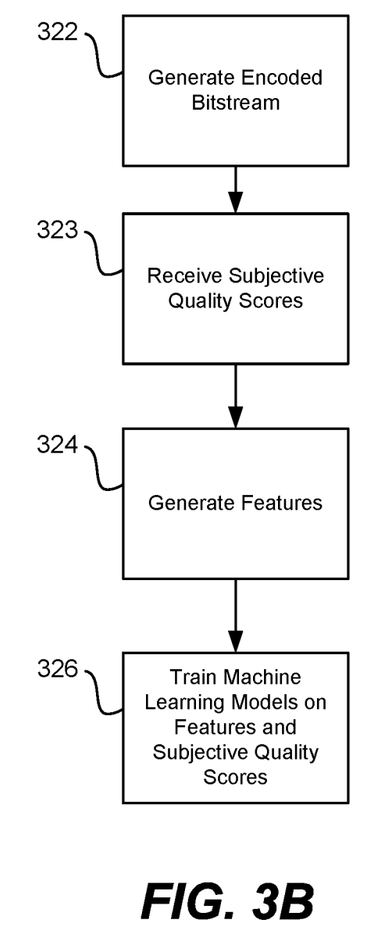

FIG. 3B presents a flowchart for training a VQA model to be used in an encoder-side implementation. Source video is encoded to generate encoded bitstreams. (322). Encoders have access to source video, and may encode the source video at various quality levels. Subjective quality scores may be received related to the encoded video. Similar to FIG. 3A, above, subjective quality scores are received from user experiments where viewers watch videos of various qualities and rate them (323). In some embodiments, the subjective quality scores are received from users who watch video that has been encoded in real time relative to playback to the users to simulate a live event experience. In other embodiments the video may be encoded prior to playback, such that playback to users for subjective quality assessment is done in a VOD paradigm rather than a live event encoding paradigm.

Features may be generated during encoding. (324). As discussed further below, some features may be generated from data obtained from or generated during an encoding process. For example, as the source video is available, the exact distortions the encoder is attempting to minimize are available as features for an objective video quality assessment model. Other features may be determined on both the decoder- and encoder-side. In some implementations, features that may be generated on both decoder- and encoder-side implementations may be generated differently on the encoder-side, particularly features related to quantization parameters or motion vectors. Models may then be trained on these various features to best approximate the subjective quality scores, including core and/or residual models as discussed above in relation to 306. (326).

In some embodiments, a model may use motion vectors as features to determine a quality score. Motion masking effects may make visual artifacts difficult to perceive when there is more motion within a frame. Thus, if a first segment has a larger amount of motion than a second segment, the quality score should be higher even if visual artifacts are similarly present in both segments. Motion may be the result of objects moving in a depicted scene, e.g., players running across a sports field. Motion may also result from a camera panning, which may result in a motion vector for an entire frame. In some embodiments, motion vectors are determined for each predictive frame during the encoding process and are used to calculate an average motion vector length of that frame as a feature. In some embodiments, a motion vector may be determined on a block basis, where a block is a portion of a frame, e.g., a 64×64 pixel area (other block sizes may also be used).

In some embodiments, a model may use motion vector angles as features to determine a quality score. Motion angle randomness can be represented by degrees where there are the most motion vectors. For example, when a camera is panning, the motion angle is uniform and concentrated in a few angles. However, when the camera is held static and motion is dominated by local motion from, e.g., a soccer player, motion vector angles may scatter around multiple angles. The uniform motion and random motion vectors may be perceived differently by a viewer, and thus impact the perceived quality of content based on the uniformity or randomness of motion.

In some embodiments, an average quantization parameter for a frame may be used as a feature for a machine learning model. In other embodiments, a spatial weighted QP is identified for each frame. In such embodiments, the block QP may be combined with a frame-rate-normalized and resolution-normalized block motion vector length to generate a spatial weighted QP for that frame. For example, as a quantization parameter increases for a block, the perceived quality of that block may decrease. However, the more motion associated with a block, the harder it is to perceive a lack of quality. Thus, a block having a large quantization parameter and a large motion vector may have a similar perceived quality as a block having a lower quantization parameter and lower motion vector length. Thus, in some embodiments motion information may be used to measure the effect of motion on perceived quality in conjunction with a quantization parameter. In some embodiments, a machine learning model may be trained to accept motion data of a frame.

A machine learning model may be trained on various determinations of quantization parameters and motion vectors. In some embodiments, an average quantization parameter for a frame may be weighted by an average motion vector length for that frame to generate a temporal weighted average QP. In some embodiments, a motion vector may be normalized to a fixed scale of a video of 2160p, 60 fps. The magnitude of the motion vector may be normalized based on the frame rate and resolution of the encoded video relative to the fixed scale. In some embodiments, the motion weights may be determined for a frame based on an inverse nonlinear function of the frame average motion vector length. The following equation may be used to determine the weights:

$$f(x) = \frac{1}{1 + e^{k(v-v_o)}}$$

Where v represents a frame average motion vector length in a frame, and $v_0$ and k represent constants that may be solved for. In various embodiments, these constants may be solved by maximizing a Spearman's rank correlation coefficient (SROCC) between the quantization parameter and the MOS for videos in a dataset. In some embodiments, a threshold value of motion is determined, above which human perception of distortion may drop significantly.

In some embodiments, the average motion for each frame may be determined, and the frames are separated into two groups based on the average motion being above or below a threshold value. An average QP for each frame in the low motion group and each frame in the high motion group may be determined and used as features for a machine learning model. In some embodiments, an average QP across all frames, an average QP for low motion frames, and an average QP for high motion frames may be determined and used as quantization parameters for a core model and a residual model as described herein.

In some embodiments, block features of frames may be used as features for machine learning models described herein. In some embodiments, an average block depth may be used as an input. During encoding, an encoder may divide a frame into blocks, where the largest block size may be, e.g., 64×64 pixels. In some embodiments, an encoder may evaluate the block and determine whether to split the block into smaller squares, e.g., 32×32, 16×16, 8×8, etc. The decision to split blocks into smaller pieces may be based on the complexity of the block. Thus, smaller block sizes may indicate more complex portions of a frame that will have a lower quality from a high QP.

In some embodiments, block statistics that may be used as features for machine learning models may include statistics based on a percentage of blocks where motion vector differences are coded and whether transform coefficients are coded. In some embodiments, block statistics may include a percentage of blocks that have a residual, a percentage of skipped blocks, and an area-weighted average log 2 of block size (which may indicate block depth). A smaller area-weighted average log 2 block size may indicate smaller blocks which indicates higher spatial-temporal complexity, and thus a lower perceived quality from a quantization parameter compared to frames having larger blocks. Smaller blocks indicate more bits are needed to encode the smaller blocks at a similar quality compared to larger blocks.

In some embodiments, a block variance weighted mean square error (MSE) is determined as a feature for machine learning models described herein. Weights to MSE from different blocks may be determined based on block variance. In such embodiments, the pixel values of the image may be used to determined block variance.

In some embodiments, a frequency domain coefficient weighted MSE is determined as a feature for machine learning models described herein. An image with strong edges may have a frequency domain with large values for low-mid frequency coefficients. As blurred edges may have a more noticeable effect on the perceived quality of a frame, in some embodiments the frequency domain coefficients may be used as features that indicate edges that may have a stronger influence on perceived quality.

FIGS. 7A and 7B present examples of features that may be provided to a core and/or residual model according to various embodiments herein. In FIGS. 7A and 7B, the feature source column refers to whether features may be determined from a bitstream, metadata, or pixel values. Feature name column refers to a name for a particular feature. The Description column presents a description of a feature. Some features may refer to a high motion or low motion block; high motion or low motion may refer to a block that has a motion vector length greater or lesser than a threshold value. Block to Frame Pooling and Frame to Segment Pooling describe how statistics for each block may be combined to determine a statistic for each frame and how statistics for each frame may be combined to determine a statistic for each segment, respectively. While mean, median, standard deviation, kurtosis, and weighted average may be specified for each feature, in various embodiments other methods of determining an average value or distribution of values may be used.

Encoder-side feature enhancement may describe how features may be differently determined in embodiments where a VQA model is implemented on the encoder-side. As encoders have access to source video, some features may be determined based on the source video or intermediate features determined during the encoding process that are not integrated into the encoded signal. In some embodiments, an encoder may compute certain features advantageously over the decoder. For example, an encoder's bit-rate controller has access to a frame level quantization parameter that is computed prior to modifying it locally for a coding unit or macroblock due to spatial and temporal properties of a particular set of video frames. Since this parameter may not be available directly in a bitstream (unless used to initialize a frame's quantization parameter), access to this parameter can improve the model's correlation with actual average quantizer used. Also, many coding units or blocks are skip coded in the bitstream (i.e. do not have an explicitly signaled quantization parameter) and hence there may be ambiguity in reconstructing the parameter that was used by the encoder.

Unlike decoders, encoders always have access to the source (or mezzanine) video. Hence, full-reference features may be computed on the encoding side without any overhead of additional transmission of such video to the decoding side. Hence, computing different distortion metrics between the source and reconstructed video is easier on the encoding side. The exact distortion that was being minimized by an encoder (e.g., during rate-distortion optimized encoding) may be known only to the encoder and hence using the same subjectively tuned distortion metrics may be easier on the encoding side.

In some embodiments, an encoder may have look-ahead processing that computes a relative importance of different blocks within a set of video frames. This information may be used to obtain different weighted averages of different features which may be called spatio-temporal pooling.

In some embodiments, an encoder may also be connected with or integrate pre-processing elements (e.g., an encoder-aware motion compensated pre-filtering or perceptually pre-filtered frames). The actual input to the encoder may be different from source frames in such cases and may be unknown at the decoding end. In such embodiments, computing features at the encoding end is advantageous to understand how frames may be modified prior to encoding. In other embodiments, an encoder or connected logic may perform de-graining prior to encoding and then add a synthesized grain pattern that is communicated through side information in a bitstream. In such embodiments, the degrained frames may be the input to the encoder and not available at the decoding end.

In some embodiments, in addition to features described in FIGS. 7A and 7B, features that may be determined in an encoder-side implementation of a VQA model described herein may include a rate-control decided average quantization parameter for each picture-type, a frame level motion extent weighted rate-control decided average quantization parameter for each picture-type, a mean squared error or weighted mean squared error between input frames to an encoder and reconstructed frames after encoding, and modified distortion functions such as psycho-visually tuned rate-distortion cost functions.

In some embodiments, the core model may be a multi-core model. A multi-core model may have different core models that are trained on sets of videos that are classified according to the spatial information (SI) or temporal information (TI) of the frames. Spatial information may represent the amount of spatial detail in a frame. A higher number may represent a more spatially complex frame, such as sharp edges and fine details, which may be more difficult to compress without losing quality. Temporal information may represent motion of a current frame from a previous frame, e.g., a panning shot will have a higher TI than a still scene. SI and TI scores may be determined by various techniques, including as described in Recommendation ITU-T P.910.

In some embodiments, a multi-core model may have three or more cores, where one core is trained on all data, and the remaining cores are trained on data that has been classified according to a feature such as SI or TI. For example, a threshold value of SI or TI may be determined and content may be classified based on having an average SI or TI higher or lower than the threshold value (average across all frames in the video). Additional core models may be trained on a subset of data based on the threshold value classification. In some embodiments, each core may output a core model quality score, which may all be combined to determine a single multi-core quality score. In some embodiments, multi-core models are trained based on a threshold value for classifying video content as having high or low SI. In some embodiments, multi-core models are trained based on a threshold value for classifying video content as having high or low TI. In some embodiments, multi-score models are trained based on threshold values for SI and TI, such that 5 total models are trained (high SI, high TI; high SI, low TI; low SI, high TI; low SI, low TI; all videos).

Figure 4:
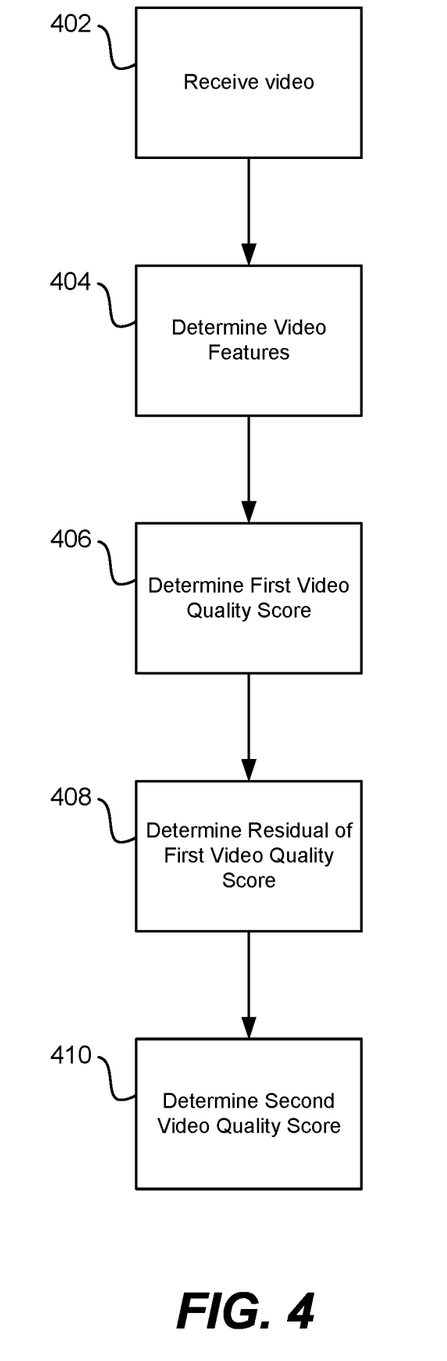
FIG. 4 presents a flowchart illustrating an example process for determining a video quality score according to various embodiments herein.

FIG. 4 presents a flowchart of determining a video quality score according to various embodiments herein. A video is received (402). In some embodiments, the video may be an encoded video bitstream, while in other embodiments the video may be received during or as part of an encoding process. Features of the video are determined (404). As discussed above, various features of video frames may be determined and used to train machine learning models as discussed herein. Frame rate, resolution, and quantization parameter may be provided to a core model to determine a first video quality score (406). In various embodiments, the quantization parameter may be weighted or modified based on motion vectors as described above.

The first video quality score and other features of the video may be provided to a residual model to determine a residual (408). In some embodiments, features relating to temporal information, spatial information, motion vectors, or blocks may be provided to the residual model. The residual represents a difference between the first video quality score and an unobserved "true" quality score of a viewer. The first video quality score and the residual may be combined to determine a second video quality score (410).

Figure 5:
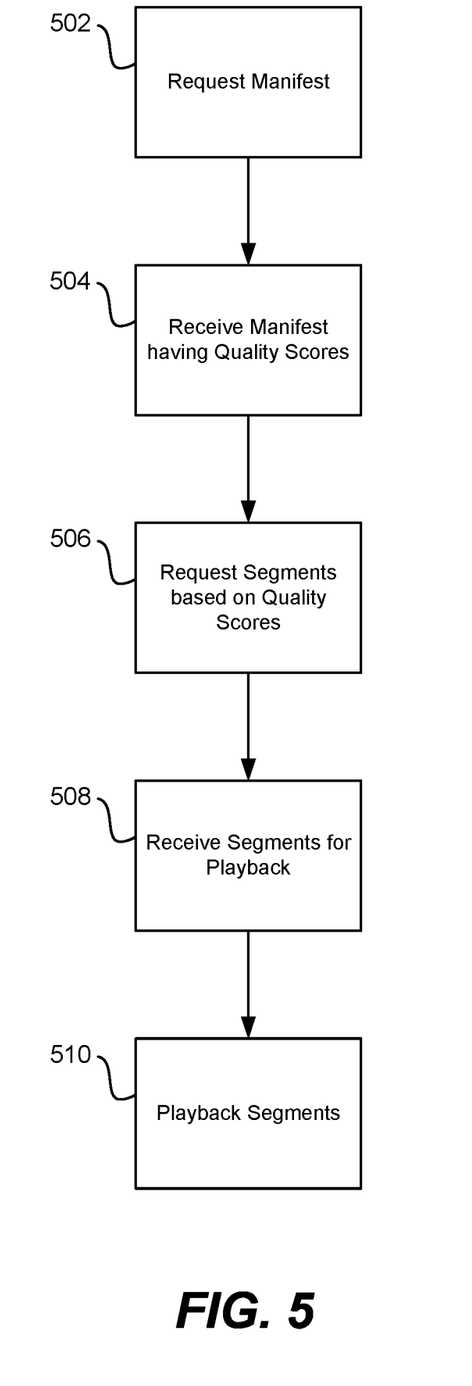
FIG. 5 presents a flowchart illustrating an example process for requesting video content according to various embodiments herein.

FIG. 5 presents a flowchart for a client device to use quality scores as described herein for selecting segments. A client may request a manifest, including manifests for live events or video on demand (VOD) content (502). The client device may receive a manifest that has a quality score for each segment (504). In some embodiments, these quality scores are determined during a live event and provided in manifest data that is continuously provided to the client device during the live event as segments are encoded. Quality scores may be determined according to various embodiments described above. In some embodiments, quality scores are determined by a core model and/or a residual model as described above. In some embodiments, the core model and/or residual model may be connected with or an encoder that is encoding segments for delivery to client devices. In such embodiments, a VQA model as described herein may determine quality scores using features that are determined from data received from an encoder.

Segments may be requested based on the quality scores (506). In some embodiments, a client device may select segments based on the quality scores in the manifest data. Quality scores may be used in addition to other considerations, such as buffer size or bitrate. In some embodiments, an adaptive bitrate algorithm may be configured to use quality score as an additional feature to use when selecting which segment to download for playback on a client device. A client device may then receive the requested segments (508), and play back the segments for a user of the client device to view (510).

Figure 6:
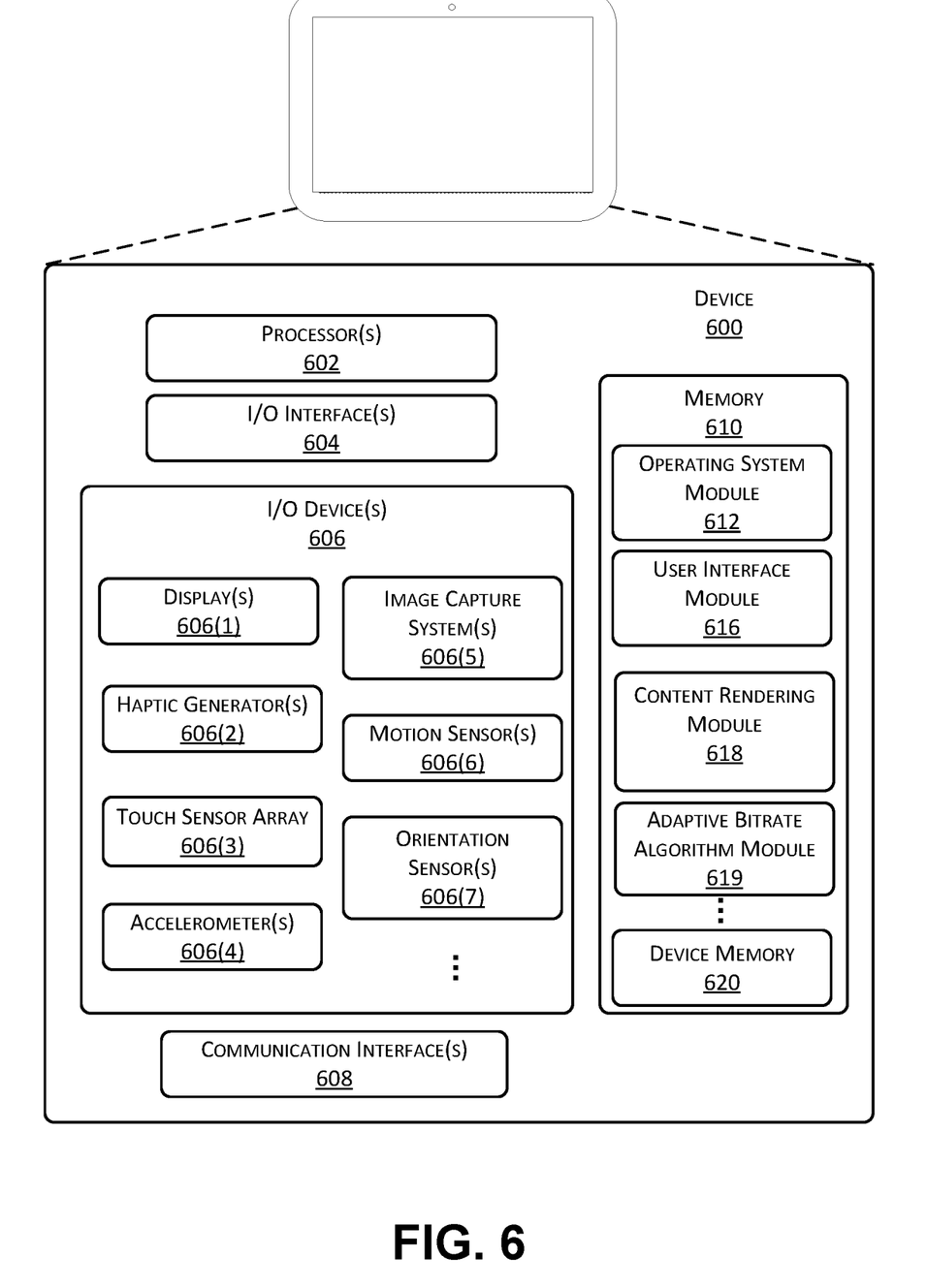
FIG. 6 is a block diagram of an example of a user device suitable for use with various embodiments discussed herein.

FIG. 6 is a block diagram of an example of a user device 600 suitable for use with various embodiments discussed above. It should be understood that user device 600 may be any of a wide variety of device types. In some embodiments, user device 600 (depicted as a tablet device) may include one or more single or multi-core processors 602 configured to execute stored instructions (e.g., in device memory 620). User device 600 may also include one or more input/output (I/O) interface(s) 604 to allow the device to communicate with other devices. I/O interfaces 604 may include, for example, an inter-integrated circuit (I2C) interface, a serial peripheral interface (SPI) bus, a universal serial bus (USB), an RS-232 interface, a media device interface (e.g., an HDMI interface), and so forth. I/O interface(s) 604 may be coupled to one or more I/O devices 606 which may or may not be integrated with client device 600.

User device 600 may also include one or more communication interfaces 608 configured to provide communications between the device and other devices. Such communication interface(s) 608 may be used to connect to cellular networks, personal area networks (PANs), local area networks (LANs), wide area networks (WANs), and so forth. For example, communications interfaces 608 may include radio frequency modules for a 3G, 4G, or 5G cellular network, a WiFi LAN and a Bluetooth PAN. User device 600 may also include one or more buses or other internal communications hardware or software (not shown) that allow for the transfer of data and instructions between the various modules and components of the device.

User device 600 may also include one or more memories (e.g., memory 610). Memory 610 may include non-transitory computer-readable storage media that may be any of a wide variety of types of volatile and non-volatile storage media including, for example, electronic storage media, magnetic storage media, optical storage media, quantum storage media, mechanical storage media, and so forth. Memory 610 may provide storage for computer readable instructions, data structures, program modules and other data for the operation of user device 600. As used herein, the term "module" when used in connection with software or firmware functionality may refer to code or computer program instructions that are integrated to varying degrees with the code or computer program instructions of other such "modules." The distinct nature of the different modules described and depicted herein is used for explanatory purposes and should not be used to limit the scope of this disclosure.

Memory 610 may include at least one operating system (OS) module 612 configured to manage hardware resources such as I/O interfaces 604 and provide various services to applications or modules executing on processor(s) 602. Memory 610 may also include a user interface module 616, a content rendering module 618, an adaptive bitrate algorithm module, and other modules. Memory 610 may also include device memory 620 to store a wide variety of instructions and information using any of a variety of formats including, for example, flat files, databases, linked lists, trees, or other data structures. Such information includes content for rendering and display on display 606(1) including, for example, any type of video content.

In some embodiments, a portion of device memory 620 may be distributed across one or more other devices including servers, network attached storage devices, and so forth.

In some embodiments, memory 610 may comprise instructions for requesting manifest data and segments during streaming of content, including live event content. In some embodiments, logic used to request segments (represented by 619 in FIG. 6) may be implemented in a variety of ways.

It will also be understood that user device 600 of FIG. 6 is merely an example of a device with which various implementations enabled by the present disclosure may be practiced, and that a wide variety of other device types may also be used. The scope of this disclosure should therefore not be limited by reference to device-specific details.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity.

Finally, although various advantages have been discussed herein with reference to various implementations, it will be understood that the scope of the invention should not be limited by reference to such advantages. Rather, the scope of the invention should be determined with reference to the appended claims.

What is claimed is:

1. A system, comprising:
one or more processors; and
one or more memories storing computer-executable instructions that, when executed by the one or more processors, configure the one or more processors for:
receiving video content comprising video frames;
determining metadata features comprising a quantization parameter (QP) or Constant Rate Factor (CRF), a codec, a bit depth, an average bitrate, a frame rate, and a resolution of the video content;
determining a first video quality score of the video content using a first trained random forest model by providing the metadata features as inputs to the first trained random forest model;
determining a second video quality score using a second machine learning model and a third video quality score using a third machine learning model, wherein the second machine learning model is trained on video content having spatial information above a threshold value and the third machine learning model is trained on video content having spatial information below the threshold value;
determining average QP, spatial and temporal motion weighted QP, frame average motion magnitude, motion direction, motion randomness, encoding block statistics, frame size, local frequency-coefficients-weighted, and variance-weighted encoding error of the video frames during an encoding or a decoding of the video content, wherein the temporal motion weighted QP is based on a normalized average motion vector length for each frame of video content;
determining a residual prediction of the first video quality score based on the first video quality score, the second video quality score, the third video quality score, average QP, spatial motion weighted QP, frame average motion magnitude, motion direction, motion randomness, encoding block statistics, frame size, local frequency-coefficients-weighted, and variance-weighted encoding error of the video frames using a second trained random forest model; and
determining a second video quality score based on the first video quality score and the residual prediction.

2. The system of claim 1, further comprising selecting an encoding profile based on the second video quality score.

3. The system of claim 1, wherein the first machine learning model is trained on a first average quantization parameter for all video frames, a second average quantization parameter for all video frames having an average motion magnitude below a threshold value, and a third average quantization parameter for all video frames having an average motion magnitude at or above the threshold value.

4. The system of claim 1, wherein the video content is of a live event.

5. A method, comprising:
receiving video content comprising video frames;
determining metadata features comprising a quantization parameter (QP) or Constant Rate Factor (CRF), a frame rate, and a resolution of the video content;

determining a first video quality score of the video content based on the metadata features using a first machine learning model;

determining a second video quality score using a second machine learning model and a third video quality score using a third machine learning model, wherein the second machine learning model is trained on video content having spatial information above a threshold value and the third machine learning model is trained on video content having spatial information below the threshold value;

determining additional features of the video content;

determining a residual prediction of the first video quality score based on the first video quality score, the second video quality score, the third video quality score, and the additional features using a fourth machine learning model; and determining a fourth video quality score based on the first video quality score and the residual prediction.

6. The method of claim 5, wherein the metadata features further include a codec, a bit depth, an average bitrate, or any combinations thereof.

7. The method of claim 5, wherein the additional features are determined during encoding of the video content.

8. The method of claim 5, wherein the first machine learning model and the second machine learning model are random forest models.

9. The method of claim 5, further comprising selecting an encoding profile based on the second video quality score.

10. The method of claim 5, wherein the additional features comprise a frame average motion magnitude, motion direction, motion randomness, or any combinations thereof.

11. The method of claim 5, wherein the additional features comprise statistics of blocks used in encoding the video frames.

12. The method of claim 5, wherein the additional features comprise a block variance weighted mean square error, a frequency domain coefficients weighted mean square error, or any combinations thereof.

13. The method of claim 5, wherein the metadata features further include a codec, a bit depth, an average bitrate, or any combinations thereof.

14. A system, comprising:

one or more processors; and one or more memories storing computer-executable instructions that, when executed by the one or more processors, configure the one or more processors for:

receiving video content comprising video frames;

determining metadata features comprising a quantization parameter (QP) or Constant Rate Factor (CRF), a frame rate, and a resolution of the video content;

determining a first video quality score of the video content based on the metadata features using a first machine learning model;

determining a second video quality score using a second machine learning model and a third video quality score using a third machine learning model, wherein the second machine learning model is trained on video content having spatial information above a threshold value and the third machine learning model is trained on video content having spatial information below the threshold value;

determining additional features of the video content;

determining a residual prediction of the first video quality score based on the first video quality score, the second video quality score, the third video quality score, and the additional features using a fourth machine learning model;

determining a fourth video quality score based on the first video quality score and the residual prediction.

15. The system of claim 14, wherein the additional features are determined during encoding of the video content.

16. The system of claim 14, wherein the first machine learning model and the second machine learning model are random forest models.

17. The system of claim 14, wherein the one or more memories store further computer-executable instructions for selecting an encoding profile based on the second video quality score.

18. The system of claim 14, wherein the additional features comprise a frame average motion magnitude, motion direction, motion randomness, statistics of blocks used in encoding the video frames, or any combinations thereof.

19. The system of claim 14, wherein the additional features comprise statistics of blocks used in encoding the video frames.

20. The system of claim 14, wherein the additional features comprise a block variance weighted mean square error, a frequency domain coefficients weighted mean square error, or any combinations thereof.

* * * * *